March 7, 1933.  S. DE ORLOW  1,900,433
LIQUID LEVEL INDICATOR
Filed Oct. 16, 1926  2 Sheets-Sheet 1
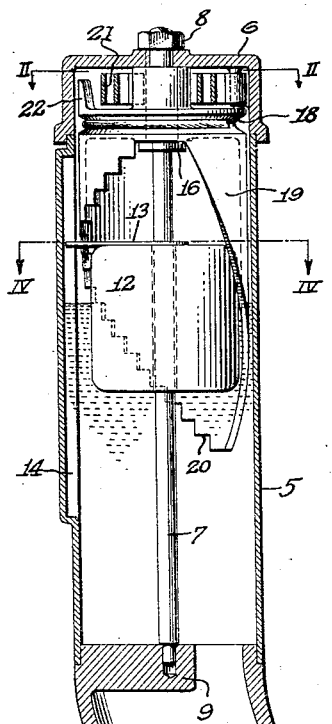
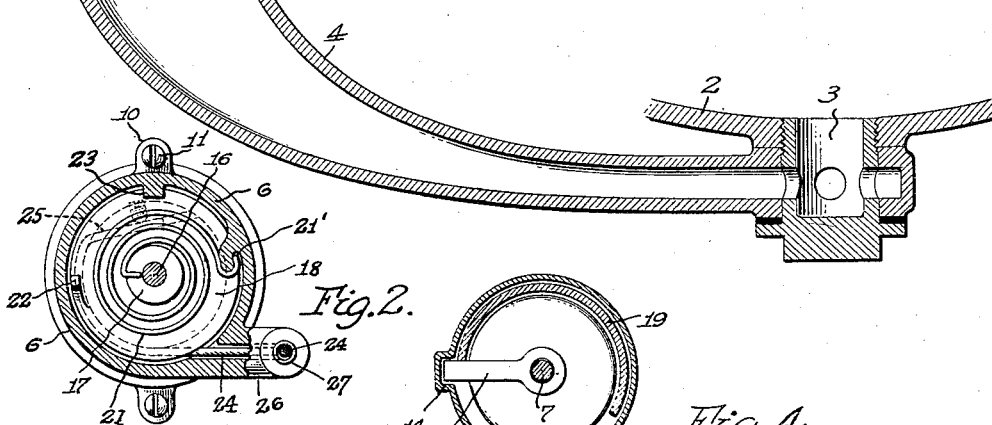
Inventor
Stephen DeOrlow,
By
Attorneys

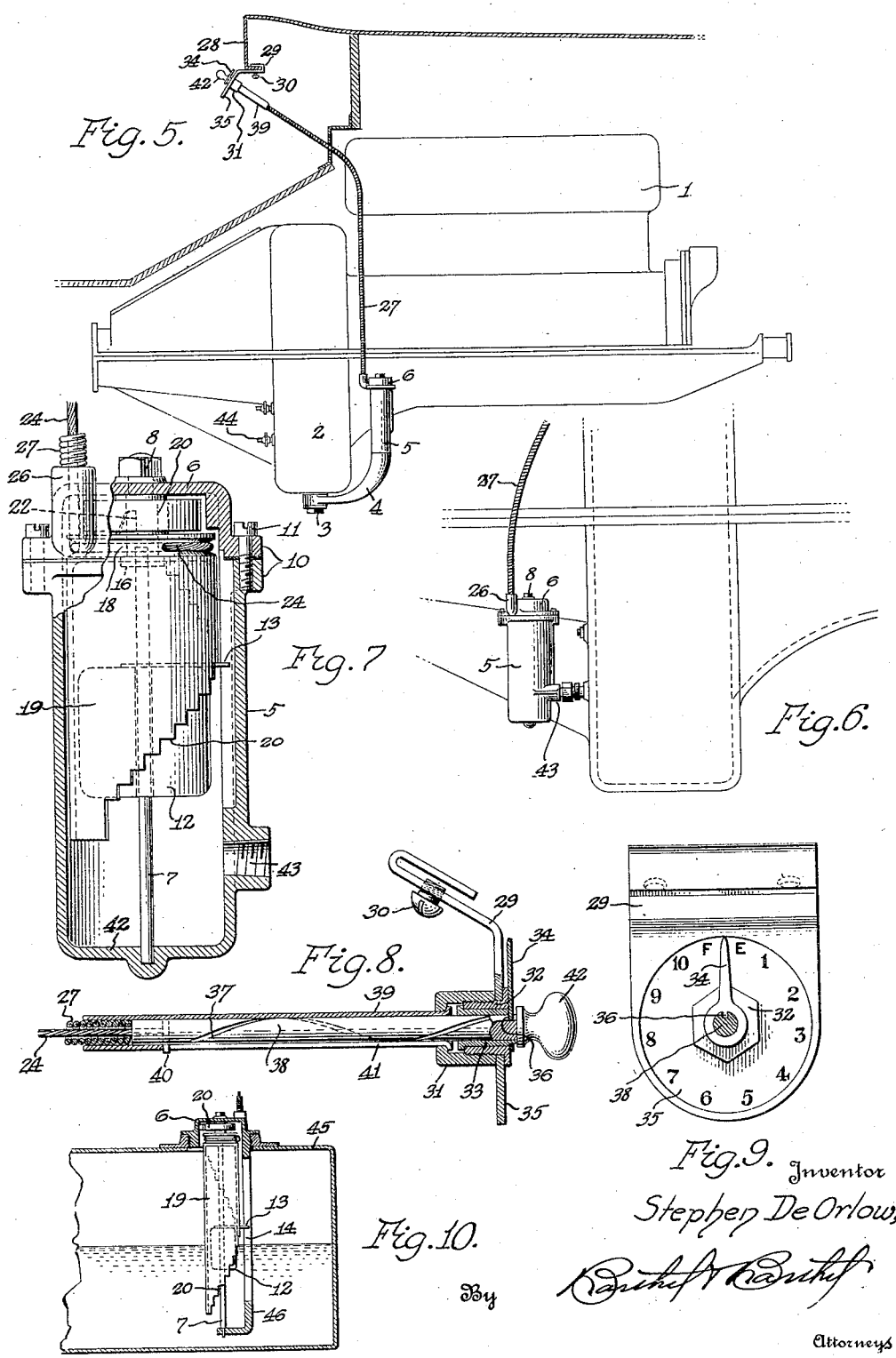

Patented Mar. 7, 1933

1,900,433

UNITED STATES PATENT OFFICE

STEPHEN DE ORLOW, OF LANSING, MICHIGAN

LIQUID LEVEL INDICATOR

Application filed October 16, 1926. Serial No. 142,035.

My invention aims to provide a durable, positive and reliable liquid level indicator by which the level of liquid in a receptacle may be ascertained at will. The liquid level indicating device has been especially designed as an oil and fuel indicator for motor driven vehicles in which the supply of oil is maintained for lubricating purposes and a supply of fuel, as gasoline, maintained for power purposes. For instance, a well known type of automobile has an engine crank case provided with superposed pet cocks located in rather an inconvenient place, because it is ordinarily necessary to crawl under the automobile to open and close the pet cocks and ascertain the level of lubricating oil within the crank case incident to replenishing the oil supply. To completely eliminate such practice my indicating device is substituted for the lowermost pet cock and the device is operatable from the dash or instrument board of the automobile so that the driver or an occupant of the automobile can at any time ascertain the level of oil in the crank case of the engine.

Another instance of using the level indicator is that of a fuel tank installation. The indicating device may be readily mounted in the filling connection or other opening of a gasoline tank and with connections to the dash or instrument board of an automobile the level of gasoline and consequently the quantity in the tank may be readily ascertained. Obviously there are other types of receptacles, normally closed or inaccessible, to which my indicating device is applicable for determining the level of liquid or the quantity thereof in the receptacle.

Structurally the indicating device is characterized by a non-rotatable and reciprocable float operating in a substantially cylindrical rotatable hollow stepped gauge member adapted to be manually rotated and by virtue of contact with an abutment of the float indicate, through the rotation of the gauge member, the position of the float. Novel means is employed for rotating the gauge member at will and indicating the degree of rotation which bears a defined ratio to the position of the float, whereby the operator of the gauge member may observe the dial and quickly determine the level or quantity of liquid which maintains the float at the position to which it is gauged.

Compared to oil and gasoline gauges which have been designed for the same purpose as my indicating device, there are no parts susceptible to excessive wear and the device is practically fool proof. Other advantages are gained by two forms of construction that will now be described by aid of the drawings, wherein Figure 1 is a vertical sectional view of the level indicating device as designed for a bottom tank connection;

Fig. 2 is a horizontal sectional view of the device taken on the line II—II of Fig. 1;

Fig. 3 is a side elevation of a portion of the device, partly broken away and partly in section;

Fig. 4 is a horizontal sectional view taken on the line IV—IV of Fig. 1;

Fig. 5 shows an installation of the device in connection with an automobile engine and the instrument board of the automobile;

Fig. 6 is a side elevation of the device as designed for a side connection with a tank;

Fig. 7 is a vertical sectional view of the side device, partly in elevation;

Fig. 8 is a longitudinal sectional view of the instrument board equipment forming part of the device;

Fig. 9 is an end view of the same, and

Fig. 10 shows a top connection of the liquid level indicator for a fuel tank.

Reference will first be had to Figs. 1 to 5 inclusive showing an automobile engine 1 having a crank case 2. This crank case ordinarily has a bottom drain connection or pet cock which is removed to accommodate a hollow screw plug 3 adapted to support and communicate with the lower end of a goose neck connection 4 adapted to extend outwardly from under the tank 2 and upwardly at one side thereof. Obviously there are many ways of attaching the goose-neck connection 4 to the tank 2 so as to communicate therewith constantly or at will.

Mounted on the upper end of the goose neck connection 4 is a vertically disposed cylindrical casing 5, on the upper end of which is fitted a cap 6 retained in place by a center rod 7 having its upper end provided with a nut 8 and its lower end suitably mounted in a spider or arm 9 carried by the upper end of the connection 4. In some instances the center rod 7 may serve as a tie rod for maintaining the connection 4, casing 5 and cap 6 assembled, but I prefer to rely on apertured lugs 10 and screws 11 for retaining the cap 6 on the casing 5. The lower end of the casing 5 may be soldered or otherwise fixedly attached to the connection 4. The center rod 7 also serves as a guide for a non-rotatable buoyant body 12, as a hollow metallic float which is prevented from rotating by an abutment 13 fixed to the top of the float 12 and extending into a longitudinal groove-way 14 of the casing 5. This way or groove may be conveniently formed by off-setting or pressing outwardly a wall of the casing 5. As shown in Fig. 1 the float 12 will be maintained at the oil level 15 in the tank 2 but said level may be raised or lowered to upper or lower oil levels without the float rotating in the casing 5. It is free and unobstructed for reciprocation in the casing 5.

On the center rod 7 is a collar 16 rotatably supporting the hub portion 17 of a peripherally grooved horizontal sheave or wheel 18 provided with a depending hollow substantially cylindrical gauge member 19 which functions somewhat as a cam. The gauge member 19 extends downwardly over the float 12 and the cylindrical wall of said member is cut away to provide clearance for the abutment 13 and to provide a plurality of level indicating steps 20 engageable with the abutment 13 to ascertain the elevation of the float 12 in the casing 5. There is a neutral position for the gauge member 19 so that the float 12 is free to rise and fall within the casing 5 and it is only by manual rotation of the gauge member 19 that one of the steps 20 will engage the abutment 13; the gauge member being returned automatically to a neutral position after each manual actuation thereof. For this automatic return of the gauge member to neutral position a spiral band spring 21 is employed about the hub portion 17 of the sheave 18. The inner convolution of the spring 21 is anchored in the sheave hub 17, as best shown in Fig. 2, and the outer convolution of said spring is anchored relative to the cap 6, as at 21′. The retractile force of the spring maintains a projection 22 of the sheave 18 normally in engagement with the inwardly projecting stop lug 23 of the cap 6 to define the neutral position of the gauge member 19, whereby the float 12 is free to rise and fall without engaging a step 20 of the gauge member 19.

For the purpose of manually actuating the gauge member a cable or flexible connection 24 is employed. This cable has an end thereof suitably anchored in the sheave 18, as at 25, and said cable extends about the sheave and through an elbow 26 into a flexible case 27 extending upwardly to an instrument board 28, dash or other support forming part of the automobile. The instrument board equipment is best shown in Figs. 8 and 9 and includes an angular bracket 29 adapted to be clamped or otherwise connected to the instrument board, as at 30. Mounted against the rear face of the bracket 29 is a cup shaped hollow nut 31 held in place by a tubular flanged bolt 32 extending through an opening provided therefor in the bracket 29. Rotatable in the tubular bolt 32 is a sleeve 33 and adapted to the outer end of this sleeve is a pointer 34 swingable in front of a dial 35 carried by the bracket 29. There is suitable indicia on the dial 36 to indicate "full", "empty", and quantities of oil that may be in the crank case 2 of the engine. This dial and the rotary pointer constitute a visual liquid quantity indicator by which an automobile operator may, at a glance, determine the quantity of oil remaining in the bottom of the crank case.

The pointer 34 has a lug 36 extending into a spiral groove 37 in a reciprocable pull rod 38 slidable in a tubular holder 39 supported from the nut 31. The flexible member is suitably attached to the pull rod 38 and said rod is held against rotation by a pin 40 or the like extending into a longitudinal slot 41 in the holder 39. A knob or handle 42 on the outer end of the rod 38 facilitates pulling the rod outwardly to impart rotation to the pointer 34 and rotation to the sheave 18, so that the gauge member 19 will be turned until it abuts the abutment 13 which is considered part of the float 12. Before considering other adaptations or installations of the liquid level indicating device, I desire to direct attention to the fact that the rotary gauge member 19 constitutes a filling instrumentality for determining the position of the float incident to variations in the level of liquid in the receptacle 5. The pull rod 38 constitutes reciprocable means for imparting rotation to the gauge member and when said pull rod is manually actuated the pointer 34 is rotated in synchronism with the rotary gauge member. This gauge member is portable until its movement is limited by the float and immediately upon the pull rod 38 being released the pointer 34 and the gauge member 19 are restored to normal position by virtue of the spring 21 which has been tensioned by manual actuation of the gauge member.

As pointed out in the beginning the indicating device is applicable to the side of the crank case 2 and this only necessitates a change in the casing or receptacle 5. The form of casing for such an installation is shown in Figs. 6 and 7 where the goose neck connection 4 is dispensed with and the casing 5 formed with a closed bottom 42 and a side connection 43. The lower pet cock 44 of the crank case is removed and the connection 43 substituted therefor. In some instances the upper pet cock may be removed and the opening plugged or otherwise closed, as suggested in Fig. 6.

Another installation is suggested in Fig. 10 where the filling connection or a suitable opening in the top wall of a gasoline tank 45 accommodates an indicating device. The casing 5 may be dispensed with and simply a depending bracket or bearing 46 employed to hold the lower end of the central rod 7. This rod will maintain the float 12 and the gauge member 19 in operative relation whereby the indicating device may be manually actuated to ascertain the level of gasoline within the tank 45 and by virtue of the dial and its pointer the quantity of gasoline remaining in the tank.

Obviously the steps 20 of the rotary gauge member 19 may be much finer than shown in the drawings, so that very small changes in the position of the float 12 may be ascertained by a manual operation, which is in contradistinction to that class of gauges wherein an indicator is automatically actuated by the rise and fall of the float. There is only one automatic operation in connection with my device and that is the action of the spring 21, which after being stressed or tensioned, restores the rotary gauge member to a normal or neutral position, whereby it cannot interfere with the rise and fall of the float incident to filling or withdrawing liquid from the casing 5.

It is thought that the operation and utility of the indicating device will be apparent without further description, and while in the drawings there are illustrated the preferred embodiments of my invention, it is to be understood that the structural elements are susceptible to such variations and modifications as fall within the scope of the appended claims.

What I claim is:—

1. A liquid level indicator comprising a receptacle adapted to receive a quantity of liquid, a floatable member in said receptacle and mounted to permit movement of the member in a predetermined direction by the rise and fall of the liquid level, said floatable member carrying an abutment, means for retaining said floatable member against rotation, a hollow open-bottom non-floatable rotatable gauge member axially alined with and receiving said floatable member and having a stepped face engageable with the abutment of said floatable member to limit rotation of the gauge member in one direction manually-actuated means engaging the upper end of said gauge member and adapted to rotate it in said one direction to ascertain the position of the floatable member in the receptacle, and means adapted to restore said gauge member to normal position whereby said floatable member may freely rise and fall in said receptacle incident to level variations of the liquid therein.

2. In a liquid level indicator, a casing having a vertical groove in its wall and in communication with the interior of the casing, a float mounted in said casing, an abutment extending from said float into said groove to hold said float against rotating in said casing, a gauge member in said casing rotatable relatively to said float, said gauge member having stepped portions adapted to engage said abutment, and level indicating means associated with said gauge member.

3. In an indicator for determining the liquid level in a receptacle, a non-rotatable floatable member carrying an abutment and mounted to be movable with the rise and fall of the liquid level in a predetermined path, a hollow open-bottom non-floatable rotatable gauge member supported co-axially with the floatable member, said gauge member having a stepped face adapted to permit engagement of a step with the abutment of the floatable member by rotation of the gauge member, and means connected with and adapted to rotate said gauge member.

4. In an indicator for determining the liquid level in a receptacle, a non-rotatable floatable member mounted to move in accordance with the rise and fall of the liquid level in a predetermined path, a rotatable gauge member having a stepped face normally out of engagement with the floatable member and adapted to engage one of the steps of the face with the floatable member by rotation of the gauge member, the step engaged being determined by the position of the floatable member, and independent means for rotating the gauge member to provide movements of the gauge member to and from its non-engaging position.

5. In an indicator for determining the liquid level in a receptacle, a stepped gauge member supported within the receptacle and rotatable to move the steps in circular paths, a non-rotatable floatable member mounted to move in accordance with the rise and fall of the liquid level in a predetermined path, said members being relatively positioned so that rotation of the gauge member will cause engagement of a step thereof with the floatable member, the step engaged being determined by the position of the floatable member provided by the liquid level.

In testimony whereof I affix my signature.

STEPHEN DE ORLOW.